United States Patent
Bradley et al.

(10) Patent No.: US 11,868,593 B2
(45) Date of Patent: Jan. 9, 2024

(54) SOFTWARE ARCHITECTURE AND USER INTERFACE FOR PROCESS VISUALIZATION

(71) Applicant: ServiceNow, Inc., Santa Clara, CA (US)

(72) Inventors: Douglas Bradley, San Diego, CA (US); Meredith Van Lier, El Cajon, CA (US); Chris Widlowski, San Diego, CA (US); Yaron Guez, San Diego, CA (US); Jacob Burman, Carlsbad, CA (US); Suzanne Lai, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 64 days.

(21) Appl. No.: 17/090,277

(22) Filed: Nov. 5, 2020

(65) Prior Publication Data

US 2022/0137795 A1    May 5, 2022

(51) Int. Cl.
*G06F 3/04842* (2022.01)
*G06T 15/00* (2011.01)
(Continued)

(52) U.S. Cl.
CPC ...... *G06F 3/04842* (2013.01); *G06F 3/04812* (2013.01); *G06F 3/04847* (2013.01); *G06T 15/005* (2013.01)

(58) Field of Classification Search
CPC ............. G06F 3/04842; G06F 3/04812; G06F 3/04847; G06T 15/005
See application file for complete search history.

(56) References Cited

U.S. PATENT DOCUMENTS 4,941,084 A    7/1990 Terada et al.
5,185,860 A    2/1993 Wu
(Continued)

FOREIGN PATENT DOCUMENTS

EP    0433979    6/1991
EP    1607824    12/2005
(Continued)

OTHER PUBLICATIONS

"Paris Now Platform Capabilities, Flow Designer," servicenow, Sep. 16, 2020.
(Continued)

*Primary Examiner* — Jennifer N Welch
*Assistant Examiner* — Ashley M Fortino
(74) *Attorney, Agent, or Firm* — McDonnell Boehnen Hulbert & Berghoff LLP

(57) ABSTRACT

An embodiment may involve a definition of a process, wherein the process is referenced by a parent entry, wherein the process includes a set of stages, wherein the stages in the set of stages are respectively associated with sets of activities, and wherein a process design application was used to define the process. The embodiment may also include one or more processors configured to: (i) receive a reference to the parent entry; (ii) identify a transformer class associated with the process design application, wherein the transformer class converts output in a first configuration related to the process design application to input in a second configuration; (iii) receive, from the transformer class, data related to the process in the second configuration; and (iv) generate a graphical user interface that displays the process and the set of stages in a hierarchical arrangement.

20 Claims, 13 Drawing Sheets

(51) Int. Cl.
*G06F 3/04847* (2022.01)
*G06F 3/04812* (2022.01)

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2004/0015366 A1* | 1/2004 | Wiseman ............ G06F 16/258 705/1.1 |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0064667 A1* | 3/2006 | Freitas .................. G06F 8/35 717/106 |
| 2006/0095461 A1 | 5/2006 | Raymond |
| 2006/0143270 A1* | 6/2006 | Wodtke ............... G06Q 10/107 709/206 |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0016706 A1 | 1/2012 | Pargaonkar et al. |
| 2013/0246106 A1* | 9/2013 | Kroetsch ............. G06Q 10/06 705/7.12 |
| 2016/0092818 A1* | 3/2016 | Kamath .......... G06Q 10/06316 705/7.26 |
| 2018/0260239 A1* | 9/2018 | Vadapandeshwara .... G06F 8/00 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

"Paris Now Platform Capabilities, Workflow," servicenow, Sep. 16, 2020.
"Paris Now Platform Capabilities, Process Automation Designer," servicenow, Sep. 16, 2020.
U.S. Appl. No. 16/358,148, filed Mar. 19, 2019.
U.S. Appl. No. 16/773,568, filed Jan. 27, 2020.

* cited by examiner

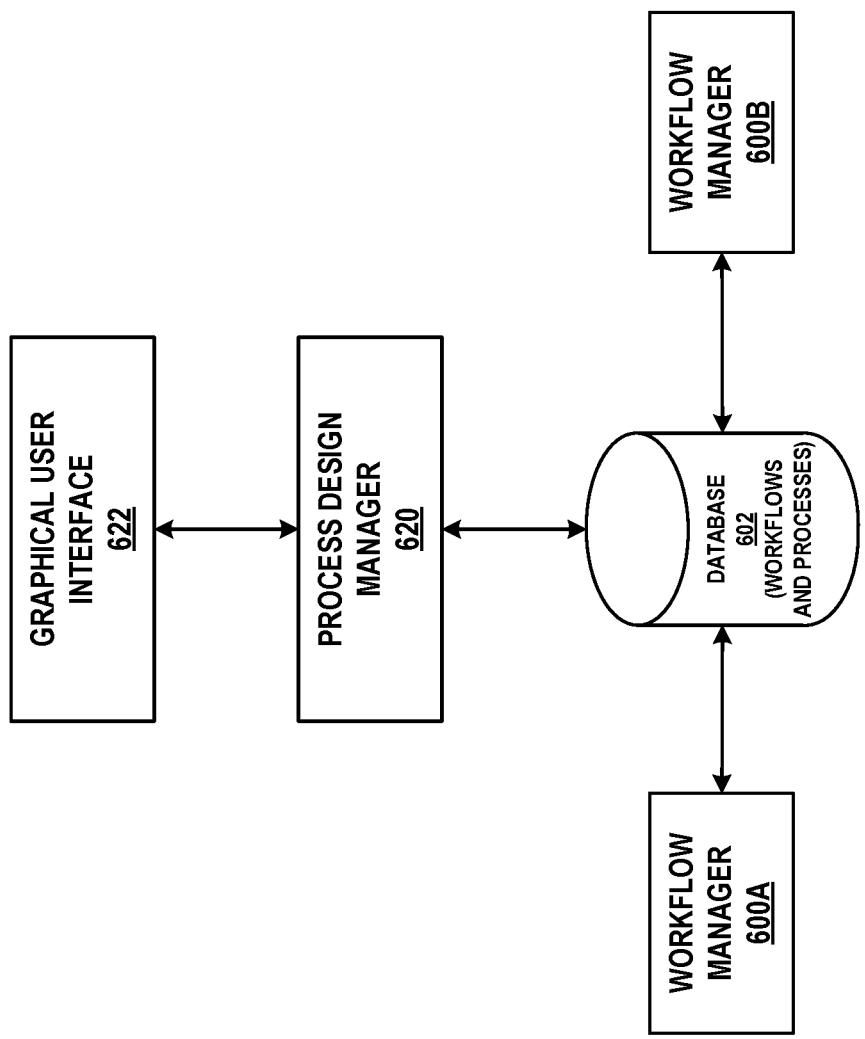

SOFTWARE ARCHITECTURE AND USER INTERFACE FOR PROCESS VISUALIZATION

BACKGROUND

Processes and workflows represent ordered arrangements of activities that can be defined by way of a graphical user interface, and then executed to carry out one or more functions. Activities within processes or workflows may include creating or updating a database table entry, displaying information to a user, or executing a client-side or server-side script as just some examples. Nonetheless, there currently is no tool for visualizing and interacting with a simplified, task-oriented view of a multiple-stage process. Thus, understanding what is happening in a process or workflow may require technical expertise that most users do not have, and it can be difficult to determine what action should be taken next to advance the process or workflow.

SUMMARY

In order to overcome these and possibly other deficiencies, a new process visualization architecture is provided.

Accordingly, a first example embodiment may involve persistent storage containing a definition of a process, wherein the process is referenced by a parent entry, wherein the process includes a set of stages, wherein the stages in the set of stages are respectively associated with sets of activities. The first example embodiment may also involve a process design application that was used to define the process. The first example embodiment may also involve one or more processors configured to: (i) receive, by a process visualization application, a reference to the parent entry; (ii) possibly based on the parent entry, identify a transformer class associated with the process design application, wherein the transformer class contains executable functions to convert output in a first configuration related to the process design application to input in a second configuration consumable by the process visualization application; (iii) receive, by the process visualization application and from the transformer class, data related to the process in the second configuration; (iv) possibly based on the data related to the process, generate, by the process visualization application, a graphical user interface that displays the process and the set of stages in a hierarchical arrangement, wherein each of the stages in the set of stages is selectable to cause the graphical user interface to further display a set of activities associated with a selected stage; and (v) transmit, by the process visualization application and to a client device, a representation of the graphical user interface.

A second example embodiment may involve receiving, by a process visualization application, a reference to a parent entry in persistent storage, wherein the persistent storage contains a definition of a process that is referenced by the parent entry, wherein the process includes a set of stages, wherein the stages in the set of stages are respectively associated with sets of activities, and wherein a process design application was used to define the process. The second example embodiment may also involve, possibly based on the parent entry, identifying a transformer class associated with the process design application, wherein the transformer class contains executable functions to convert output in a first configuration related to the process design application to input in a second configuration consumable by the process visualization application. The second example embodiment may also involve receiving, by the process visualization application and from the transformer class, data related to the process in the second configuration. The second example embodiment may also involve, possibly based on the data related to the process, generating, by the process visualization application, a graphical user interface that displays the process and the set of stages in a hierarchical arrangement, wherein each of the stages in the set of stages is selectable to cause the graphical user interface to further display a set of activities associated with a selected stage. The second example embodiment may also involve transmitting, by the process visualization application and to a client device, a representation of the graphical user interface.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B is another workflow-related architecture, in accordance with example embodiments.

DETAILED DESCRIPTION

Figure 1:
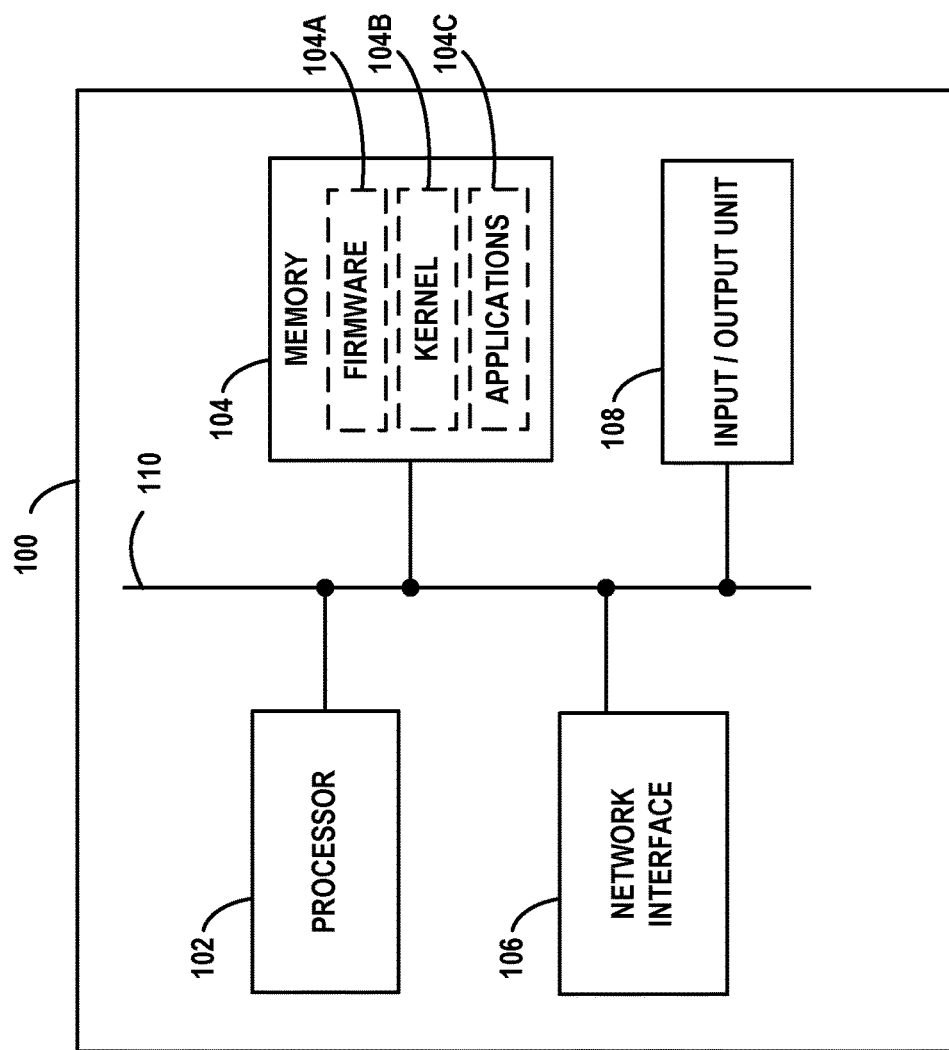
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
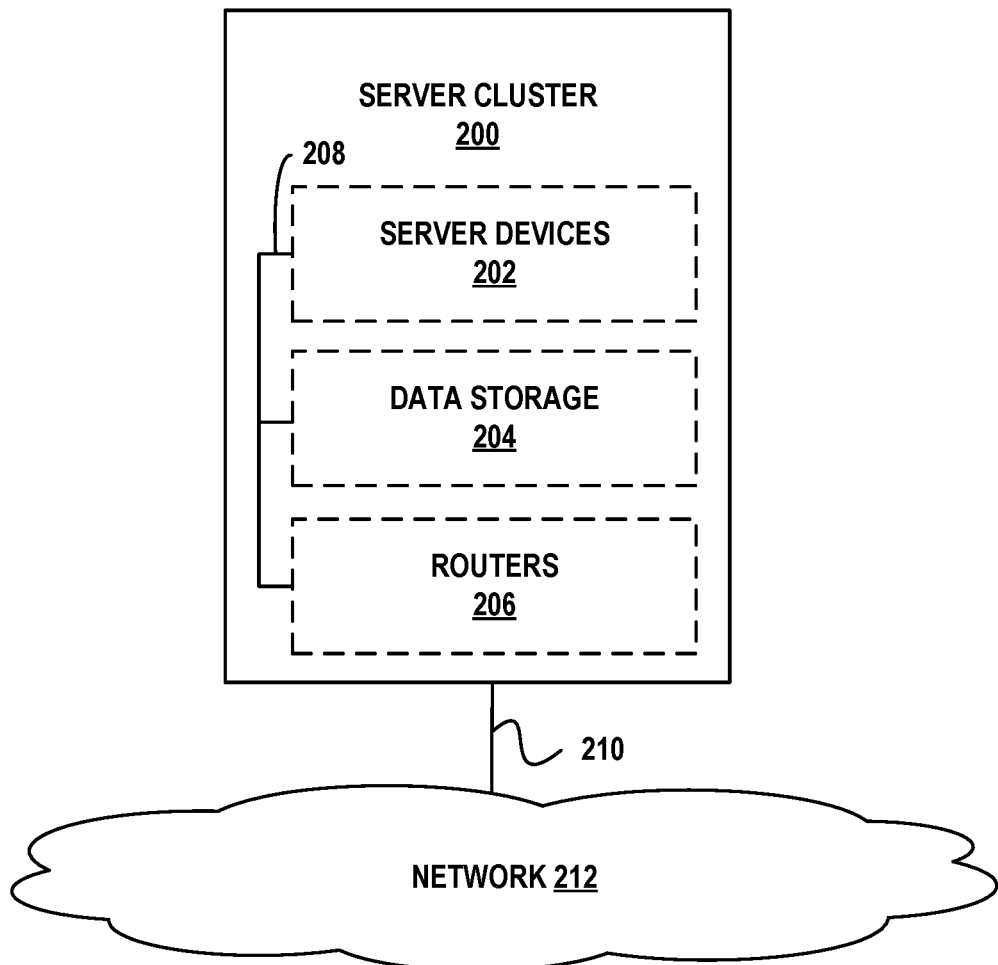
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
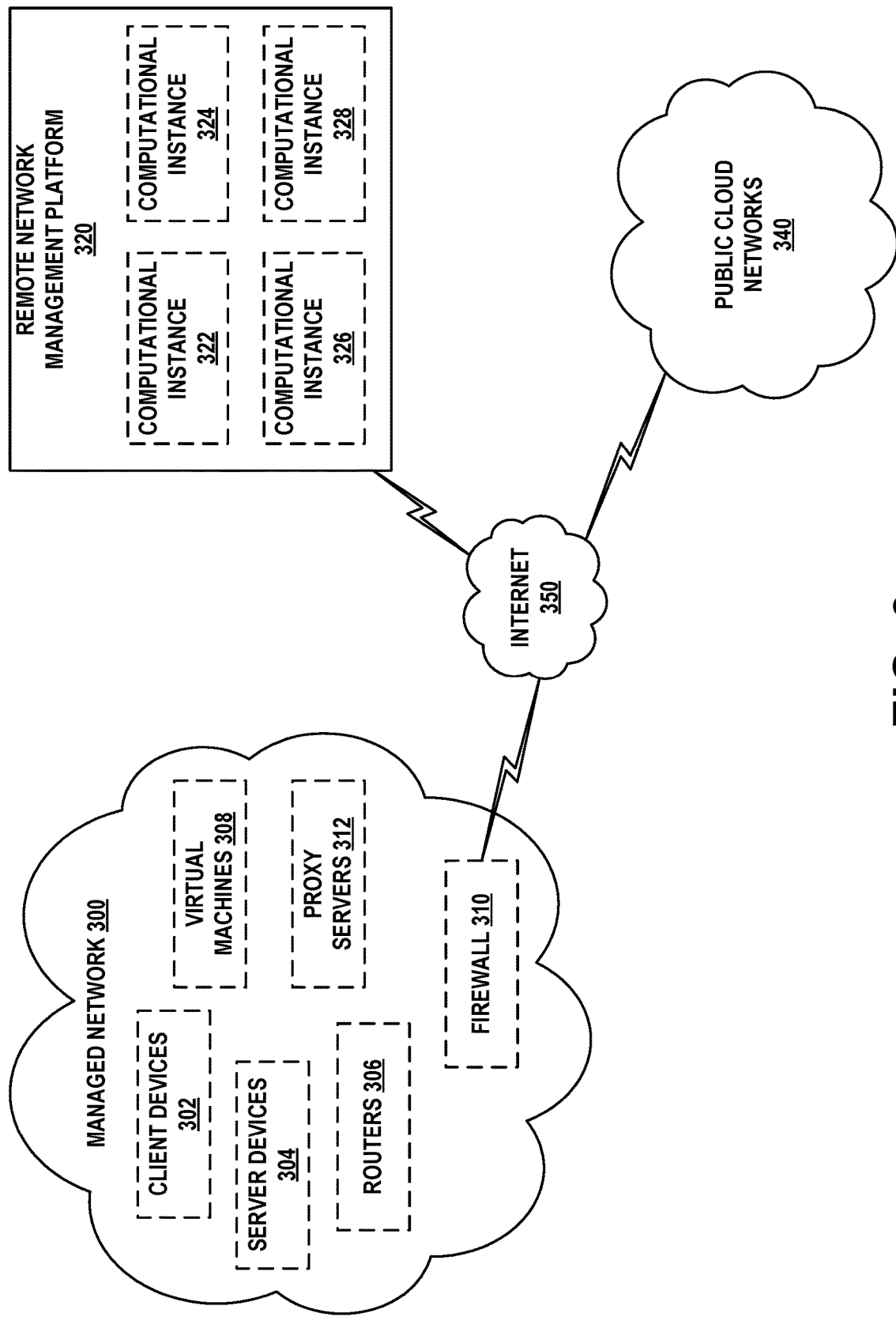
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
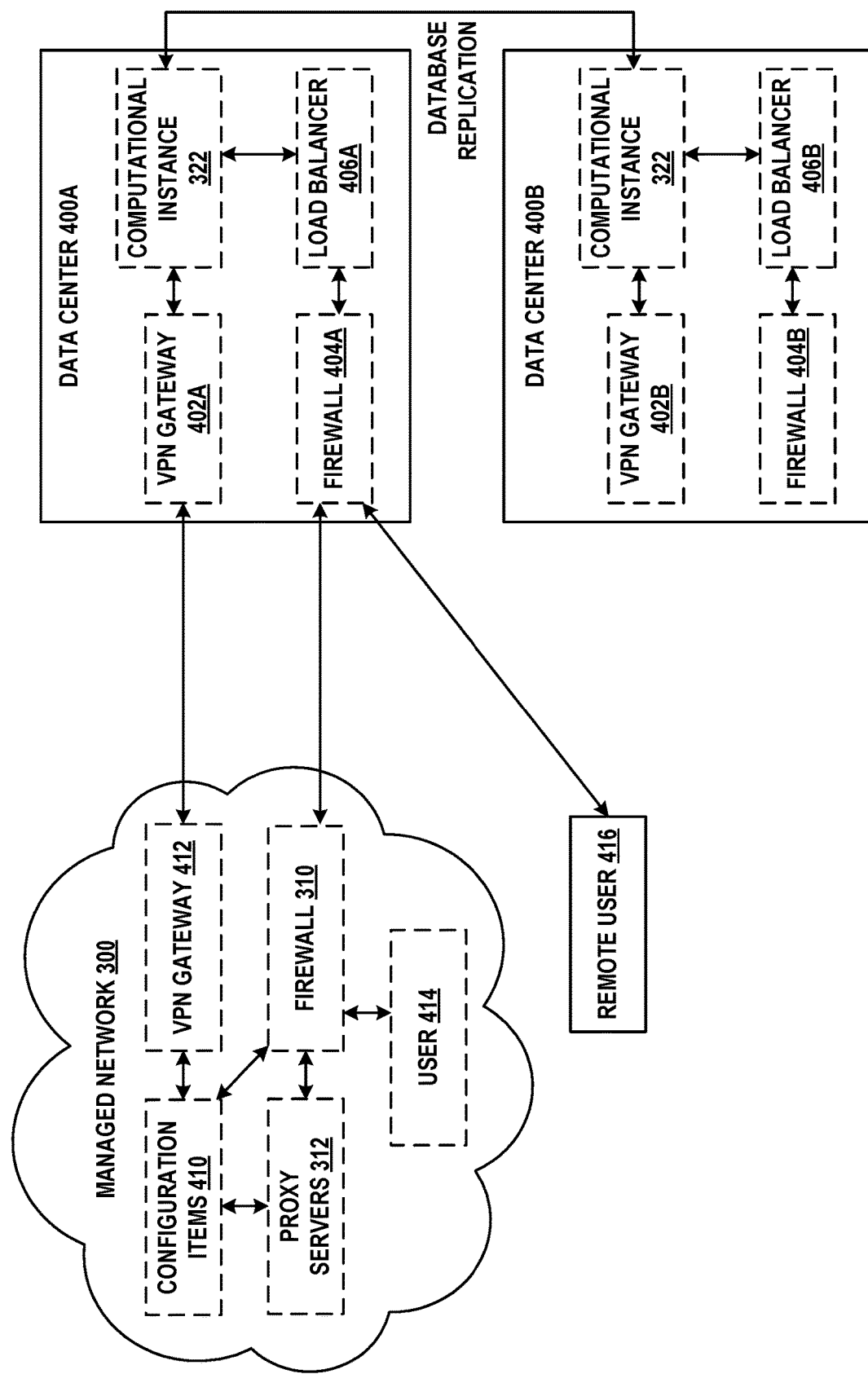
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
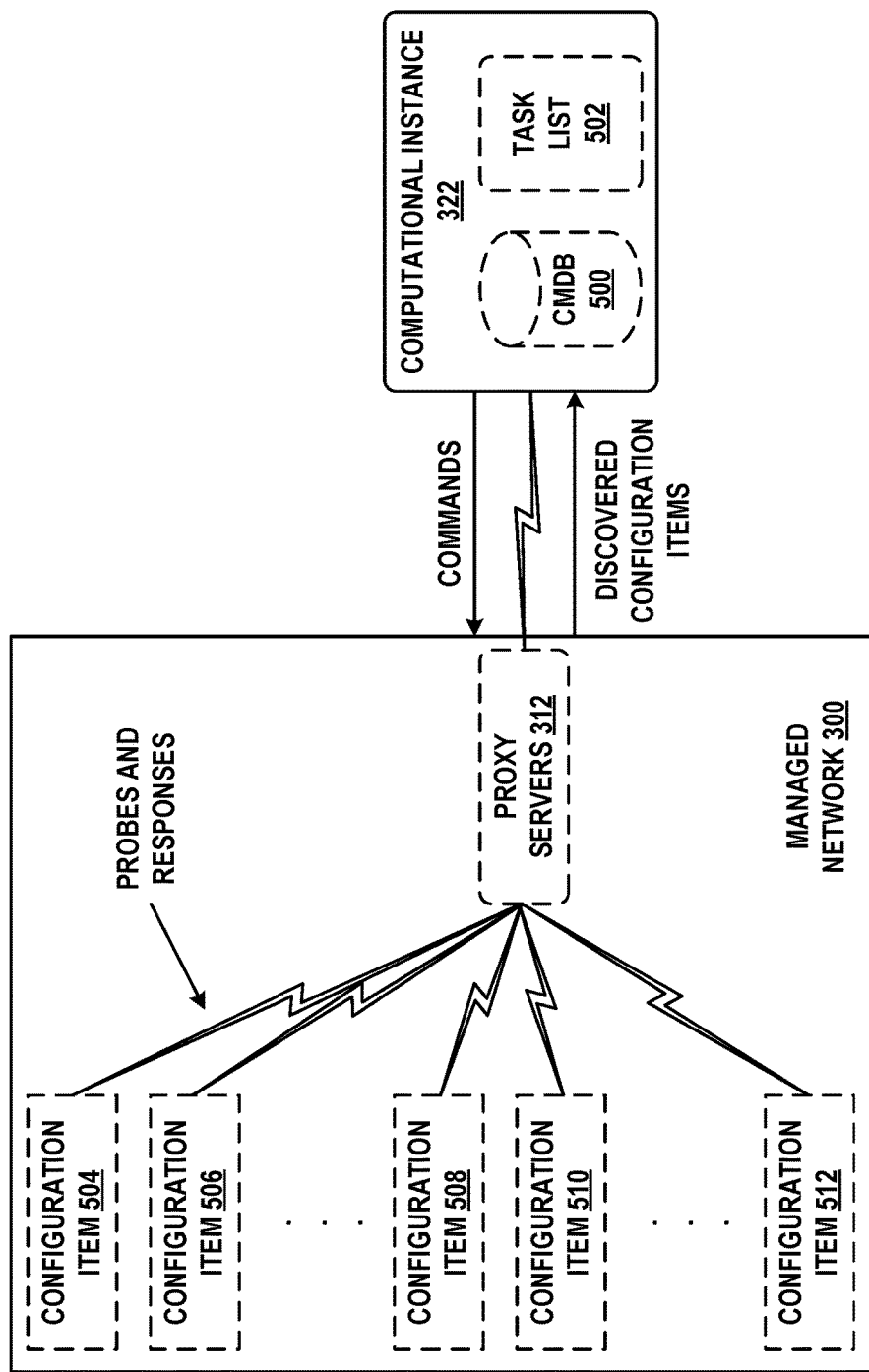
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
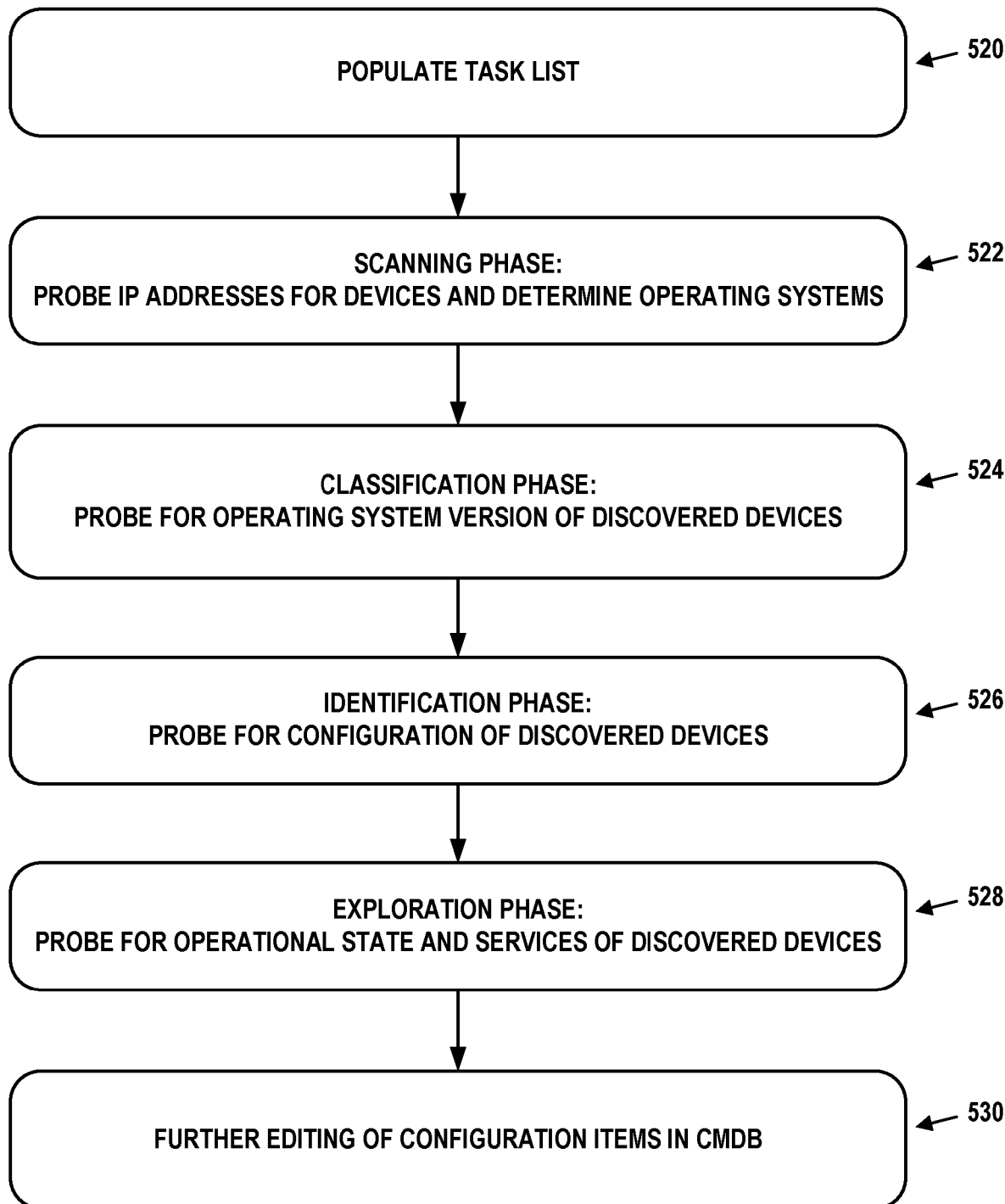
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Workflows and Processes

The embodiments herein involve workflows and processes. These are logical constructs representing patterns of activities that a computational instance of a remote network management platform may carry out on behalf of one or more users.

In general, workflows are sequences of activities, where these activities include generating entries in database tables, notifying users that their input is being requested, executing scripts, and so on. Thus, a workflow may be logically represented as graph of states (e.g., representing activities and/or related data) and transitions therebetween. Each workflow may have one or more triggers that initiate the entire workflow or cause the workflow to change state. These triggers may be based on the state of a database entry changing, reception of user input, expiry of a timer, or other events. In some cases, a workflow may resemble a flow chart, but workflows can be associated with more complex operations as well.

Examples of workflows include automatically notifying a user whenever a high-priority network or system problem is detected or reported, conducting a series of activities to onboard a new employee, or executing a program to train a machine learning model on a periodic basis. Other possibilities exist.

A workflow may include one or more predefined actions that allow entries in a particular database table to be created or written to when certain conditions are true. Actions may be reusable across multiple workflows, and thus may be designed to be non-specific to any particular workflow. Some actions are core actions that are not editable by users. A workflow may also include one or more subflows. Each subflow is a reusable sequence of actions and data input that allows the subflow to be incorporated into a workflow. Further, a workflow may make use of one or more spokes that are scoped applications dedicated to communicating with a particular database table or further application. A further application that the spoke communicates with may be internal or external to the computational instance on which the workflow executes.

In various embodiments, workflows may be created, viewed, and/or edited by way of a workflow manager application. The workflow manager may present the user with a graphical user interface allowing the user to visually design workflows. Representations of workflows that have been designed or are under design may be stored in a database.

Figure 6A:
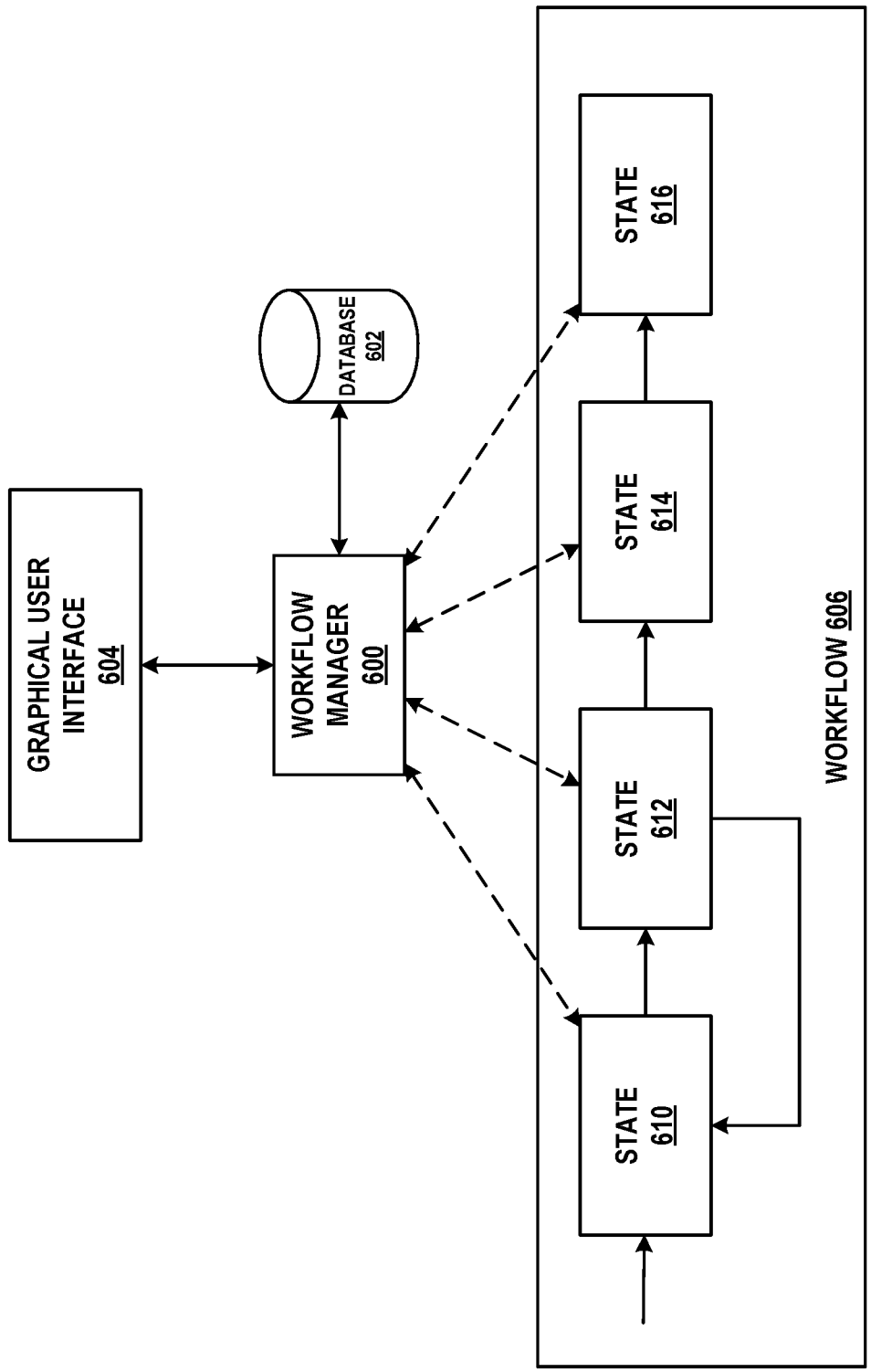
FIG. 6A is a workflow-related architecture, in accordance with example embodiments.

Such an arrangement is shown in FIG. 6A. Workflow manager 600 uses database 602 for workflow storage and generates graphical user interface 604 to facilitate visual design of workflows. Workflow manager 600 may execute on a computational instance of a remote network management platform as a web-based application for example, and database 602 may also be disposed within or accessible by way of this computational instance. In some cases, database 602 may be the same as or incorporated within a CMDB.

Graphical user interface 604 may include a series of screens that allow workflows to be defined by dragging and dropping (or otherwise specifying) graphical elements representing triggers, actions, subflows, connectors, and so on. These elements may be windows, panes, containers, tabs, dialog boxes, menus, icons, and/or controls, for example. Database tables and entries in these tables from database 602 may be associated with these elements by way of menus (e.g., dropdown menus). Support for input and/or output in various structures data formats, such as XML or JAVASCRIPT® Object Notation (JSON) may also be selectable by way of graphical user interface 604.

Workflow 606 is a simple example of a workflow, consisting of four states 610, 612, 614, and 616. A trigger (not shown) causes initiation of the workflow such that state 610 is entered. From state 610, further input (e.g., change of an entry in a table of database 602, reception of a message from an application, or user input) may cause workflow 606 to transition to state 612. Similarly, from state 612, workflow 606 may transition to either state 610 or state 614. From state 614, workflow 606 may transition to state 616. State 616 may represent completion of the workflow.

While in any state, workflow 606 may cause output in a predefined format to be written to database 602, provided to an application, or presented to a user on a graphical user interface. For example, transitioning to state 616 may cause workflow 606 to write an entry to a table in database 602.

Note that workflow manager 600 is generally used for workflow design. When a workflow executes, representations of such may appear in other graphical user interfaces (e.g., as web components). For example, if workflow execution is at a state that requires input from a specific user, that user may be presented with a reminder that this is the case in a web component on a dashboard or landing page graphical user interface provided by way of the computational instance.

While quite flexible and useful, workflows are usually limited in scope to addressing specific, discrete tasks. Large enterprises with multiple divisions often seek to establish more complex, cross-functional processes that potentially involve multiple individuals and tasks. These processes may include one or more workflows, subflows, and/or triggers, actions, and so on. Employee onboarding is an example of a cross-functional process, in which human resources, IT, accounting, and other departments have to each carry out specific tasks to take a new employee from acceptance of a job offer to becoming a fully-productive member of a team. Another cross-functional process might be the development of source code between software engineering teams. Each team may have a workflow for modifying code (e.g., checking code out, editing the code, testing the code, checking it back in), as well as a workflow for integration testing between the modules developed by other teams. A process can be developed to link these workflows so that all code modifications are properly integration tested by the other teams that rely on the modified code.

Thus, embodiments may also involve a process design manager application that allows processes to be created, viewed, and/or edited. In particular, the process design manager may present a user with a graphical user interface that supports a number of operations. These operations may include: (i) connecting multiple workflows into an end-to-end process, and/or (ii) designing new or reusing existing workflows, subflows, actions, and triggers.

Processes may be organized into stages (also referred to as lanes) of logically grouped activities, and each activity may be associated with a number of properties. Activities represent one logical step in a process, and may involve one or more workflows, subflows, actions, and/or triggers. Thus, activities may be interactive (e.g., prompting a user for input) or non-interactive (e.g., executing in the background without user input). The graphical user interface may guide the user through process design procedures, and allow the user to edit processes by way of dragging and dropping (or otherwise specifying) graphical elements.

As an example, FIG. 6B includes process design manager 620, which uses database 602. It is assumed that database 602 contains representations of one or more workflows, processes, subflows, actions, triggers, and/or other components.

The workflows stored in database 602 may include those designed by way of workflow manager 600A and/or 600B. Notably, workflow managers 600A and 600B may be software applications that design and store workflows in different ways. Thus, process design manager 620 may be able to use workflows that have different origins and/or are stored in different formats. Just one or more than two workflow managers may be present.

Not unlike graphical user interface 604, graphical user interface 622 may include a series of screens that allow processes to be defined by dragging and dropping (or otherwise specifying) graphical elements representing processes, workflows, triggers, actions, subflows, connectors, and so on. These elements may be windows, panes, containers, tabs, dialog boxes, menus, icons, and/or controls, for example. Database tables and entries in these tables from database 602 may be associated with these elements by way of menus (e.g., dropdown menus). Support for input and/or output in various structures data formats, such as XML or JSON may also be selectable by way of graphical user interface 622.

Like workflow manager 600, process design manager 620 is generally used for design. Process design manager 620 may also produce runtime data representing the status of executing processes. This runtime data may include a context record for each executing process, workflow and/or activity. Such context records may also be stored in database 602.

Notably, process design manager 620 does not necessarily replace workflow manager 600. Instead, it leverages the functionality of workflow manager 600 to define workflows, subflows, actions, and/or triggers that empower an activities associated with a process. Moreover, both process design manager 620 and workflow manager 600 may rely on more primitive remote network management platform capabilities (e.g., database table entry creation and update, interactive approvals, user notifications, and so on). Further, processes designed by way of multiple process design managers may be logically combined into a parent process.

Nonetheless, despite the power and flexibility of process design manager 620 and workflow manager 600, there currently is no tool for visualizing a simplified, task-oriented view of a multiple-stage process. Instead, a user attempting to ascertain the status of each stage of a process is required to look up and view each constituent workflow, subflow, and so on. The user is prevented from being able to easy determine these statuses or what needs to be done next to advance the process, and instead has to scan fields in database tables and working notes (if present) to draw any conclusions. Furthermore, the statuses of each processes associated with a given parent process may be represented in different ways. Thus, the simple goal of understanding what is happening in a process may require technical expertise that most users do not have. Moreover, it can be difficult to determine what action should be taken next.

VI. Process Visualization Architecture

Figure 6C:
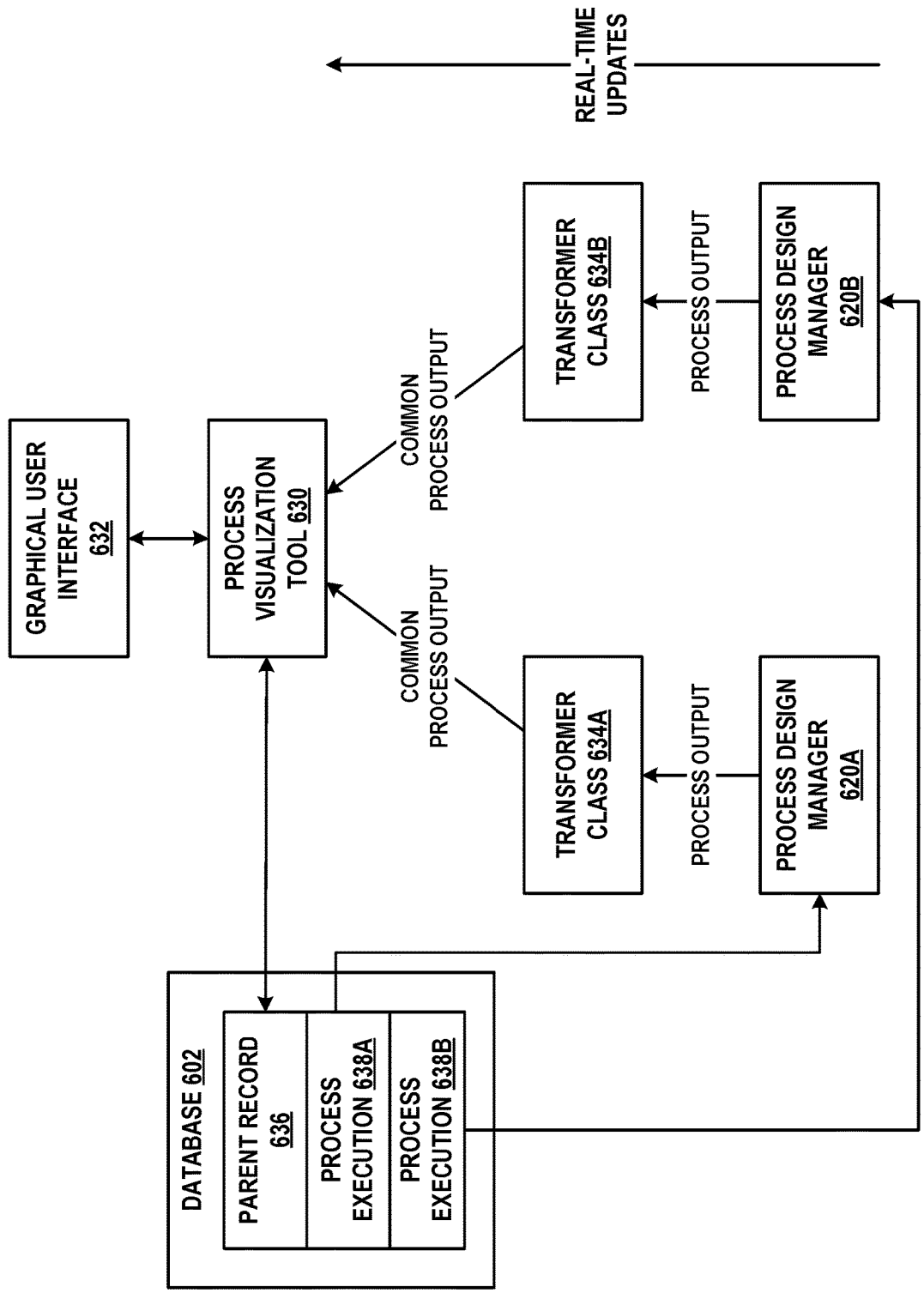
FIG. 6C depicts the operation of a process visualization tool, in accordance with example embodiments.

In order to overcome these and possibly other deficiencies, a new process visualization architecture is provided as depicted in FIG. 6C. In this architecture, two potentially different process design managers 620A and 620B carry out the functionality of process design manager 620, and also provide (directly or indirectly) process output to respectively associated transformer classes 634A and 634B.

This process output may include process structure (e.g., representations of the stages in each process and the activities within each stage) and the status of each process and activity). The process output from each process design manager may be formatted differently. Consequently, the associated transformer classes 634A and 634B may serve to respectively transform different process output configurations native to process design manager 620A and 620B into a common process output configuration that is consumable by process visualization tool 630. For example, fields or structures used to store data generated by process design manager 620A may be converted into fields and data formats supported by process visualization tool 630. Further, fields or structures used to store data generated by process design manager 620B may be also converted into fields and data formats supported by process visualization tool 630.

When a process designed by way of a process design manager is accessed by process visualization tool 630, the system may search for a registered transformer class. Once such a class is found, a reference to this class may be stored. Then, the reference (or the class's name) may be passed into API calls involving process visualization tool 630 and the process. In this way, the transformer class is known to any function, method, or subroutine of program logic that may need to transform data from a process design manager.

Database 602 may contain parent record 636, which is associated with process executions 638A and 638B. Parent record 636 is a reference to or a handle for a parent process incorporating processes created by way of process design manager 620A and 620B. Parent record 636 includes process execution entry 638A related to the current state of execution of a process from process design manager 620A, as well as process execution entry 638B related to the current state of execution of a process from process design manager 620B. In some cases, execution of a process or workflow could cause the creation of a new parent record with its own associated processes and/or workflows.

Process visualization tool 630 provides an organized way of envisioning one or more processes of a particular parent process. From process execution entries 638A and 638B, process visualization tool 630 is capable of correlating information that is stored in database 602 and related to these processes with process output received from process design manager 620A and 620B. Process visualization tool may generate graphical user interface 632, which provides a consolidated view of the progress of all aspects of the parent process. Example embodiments of this graphical user interface are shown below. This architecture allows any software application executing on a remote network management platform to potentially be able to integrate with process visualization tool 630.

As a point of clarity, in some embodiments, process visualization tool 630 does not need to create any new database table or entries therein that contain the definitions of processes. Instead, the existing process definitions stored in existing database tables, as created by way of a process design manager or similar application, may be used. Thus, database tables specific to process visualization tool 630 may be limited to those that define its configuration.

The visualization architecture of FIG. 6C may also support displaying real-time updates of database table entries and other information. For example, record watcher triggers may be placed on database tables, fields within these tables, and/or entries within these tables. If a watched entity changes, such as by way of process design manager 620A or 620B, a flow manager, another application, or manual editing of database 602, a real-time update indicating this change is propagated from database 602 to process visualization tool 630 and/or from process design manager 620A or 620B to process visualization tool 630. Process visualization tool 630 may then update graphical user interface 632 accordingly to reflect the change. In this fashion, multiple users can be changing various states of processes, workflows, subflows, and/or or database table entries used by database 602, and graphical user interface can automatically reflect these changes. Further, users of process visualization tool 700 may make changes to database table entries or any other modifiable aspect of a process or workflow.

Moreover, some or all of graphical user interface 632 may be implemented as a modular web component that can be included within or docked to another graphical user interface. Such a web component may include custom or standard application programming interfaces, HTML tags, widgets, and/or scripts, and may call various JAVASCRIPT® library functions.

Figure 7:
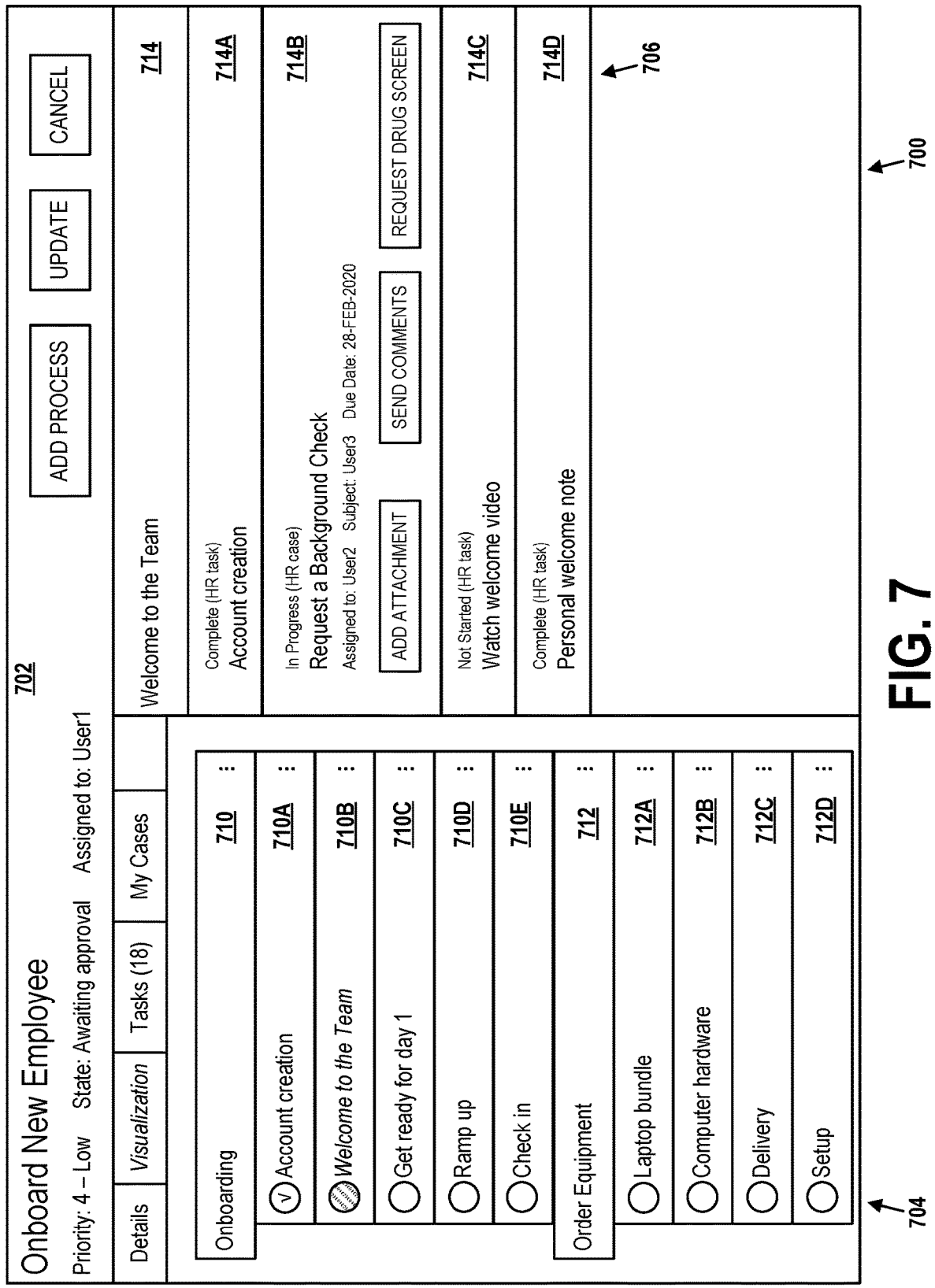
FIG. 7 depicts a graphical user interface for viewing processes and their constituent components, in accordance with example embodiments.

To that point, FIG. 7 depicts example graphical user interface 700. Graphical user interface 700 is a visualization of a parent process. In this visualization, the parent process is represented in a hierarchical menu structure as one or more processes, where each of the processes have a number of stages, and each of the stages have a number of activities. This visualization structure as presented maps to the structure of processes as described above, where processes includes stages and stages include activities. However, other mappings are possible and other names for various layers in the hierarchy may be used. In some embodiments, a process may be referred to as a playbook, for example.

Graphical user interface 700 largely comprises header 702, left pane 704, and right pane 706. Each of these may be a web component that can be included, positioned, or arranged within a larger graphical user interface framework.

Header 702 displays information about the parent process, which may have been obtained by way of a parent record in a database, such as parent record 636. Header 702 provides a title of the parent process ("Onboard New Employee"), as well as the parent process's priority (low), state (waiting approval), and to whom the overall responsibility for the parent process is assigned (User1). Header 702 also includes buttons for adding a new process to the display, updating database table entries associated with the current display, or cancelling certain modifications made to the display and exiting graphical user interface 700.

As noted, a parent record is associated with one or more processes. These processes are displayed in pane 704 in an indented menu. Particularly, process 710 ("Onboarding") includes stages 710A, 710B, 710C, 710D, and 710E as indented menu items, while process 712 ("Order Equipment") includes stages 712A, 712B, 712C, and 712D as indented menu items.

To the left of each of the indented menu items indicating stages, a circular progress indicator is shown. These progress indicators visually represent or approximate a portion (e.g., fraction or percentage) of completeness for the associated stage. As examples, the progress indicator of stage 710A specifies that it is complete by way of a check mark, the progress indicator of stage 710B specifies that it is partially complete by way of hashmarks, and the progress indicator of stage 710C specifies that it has not yet been started by way of an empty circle. Other types of progress indicators, such as progress bars, hourglasses, spinning pinwheels, a number, and/or numerical percentages could be used.

To the right of each of the indented menu items indicating stages, a vertical ellipsis is shown. Such an element, when clicked on or otherwise selected, may cause a drop-down menu to appear. From this menu, an action to apply to the associated stage may be selected. For example, menu options might include marking the entire stage (and all activities therein) as completed or not yet started. The vertical ellipses are examples of declarative actions that will be discussed in more detail below.

Each stage in pane 704 is selectable. When such a stage is selected, a visual representation of its activities is displayed in pane 706. For example, in pane 704, stage 710B is selected (indicated as such with italics), and the activities of this stage are shown in pane 706 within cards 714A, 714B, 714C, and 714D.

Card 714 displays the title of the selected activity for purposes of context. Card 714A indicates that the account creation activity has been completed. Card 714B indicates that the background check activity is in progress. Card 714B also indicates who is responsible for this activity (User2), the subject of the activity (User3), and the due date. Further, card 714B includes buttons that can be used to trigger declarative actions. Card 714C indicates that the welcome video watching activity has not yet started. Card 714D indicates that the personal welcome note activity has been completed. In some embodiments, completed stages may be grayed out and/or might not be available for editing.

Notably, graphical user interface 700 is navigable. Thus, if the user clicks on or otherwise selects any stage in pane 704, the associated activities appear in pane 706, replacing any existing activities that were already displayed in pane 706. Additionally, each activity may be associated with a number of activity properties that may vary based on the type of activity. These activities may be mapped to particular steps in a process, workflow, or subflow by way of process design manager 620, for example.

Overall, the visualization of graphical user interface 700 solves many of the technical and practical problems associated with processes and workflows. From graphical user interface 700, a user can easily determine the state of each process, as well as the state of each stage of these processes. Complete, partially complete, and un-started processes and stages are clearly indicated as such, possibly with visual calls to action. Further, the specific activities needed to complete a stage and the individuals responsible can be found with minimal navigation. Also, filters can be applied to the activities of any stage to focus on activities that match a query or are relevant to a particular user.

Declarative actions may be associated with various actuatable graphical controls of graphical user interface 700 (e.g., ellipses, buttons, menus, icons). Such actions may be context sensitive and configurable, and thus vary based on server conditions, client conditions, parent record conditions, process conditions, activity conditions, and/or other data. These conditional may be Boolean, algebraic, and/or propositional. Thus, when, where, and whether these graphical controls appear in a given location of graphical user interface 700 is highly configurable.

To that point, the layout and content of each card can be defined by a renderer. A renderer may encompass a schema, data, and/or program logic that causes a card to be rendered in a specific manner. There may be one or more default renderers that can be employed, and custom renderers may be developed as well.

More specifically, a renderer may support displaying the properties of an activity in a number of ways. These properties may include, for example, support for forms, attachments, checklists, timer countdowns, rich text, deep linking to related database table entries, dot-walking of database tables or field references, icon actions, buttons, drop-down menus, and so on. Other types of properties may exist.

Figure 8:
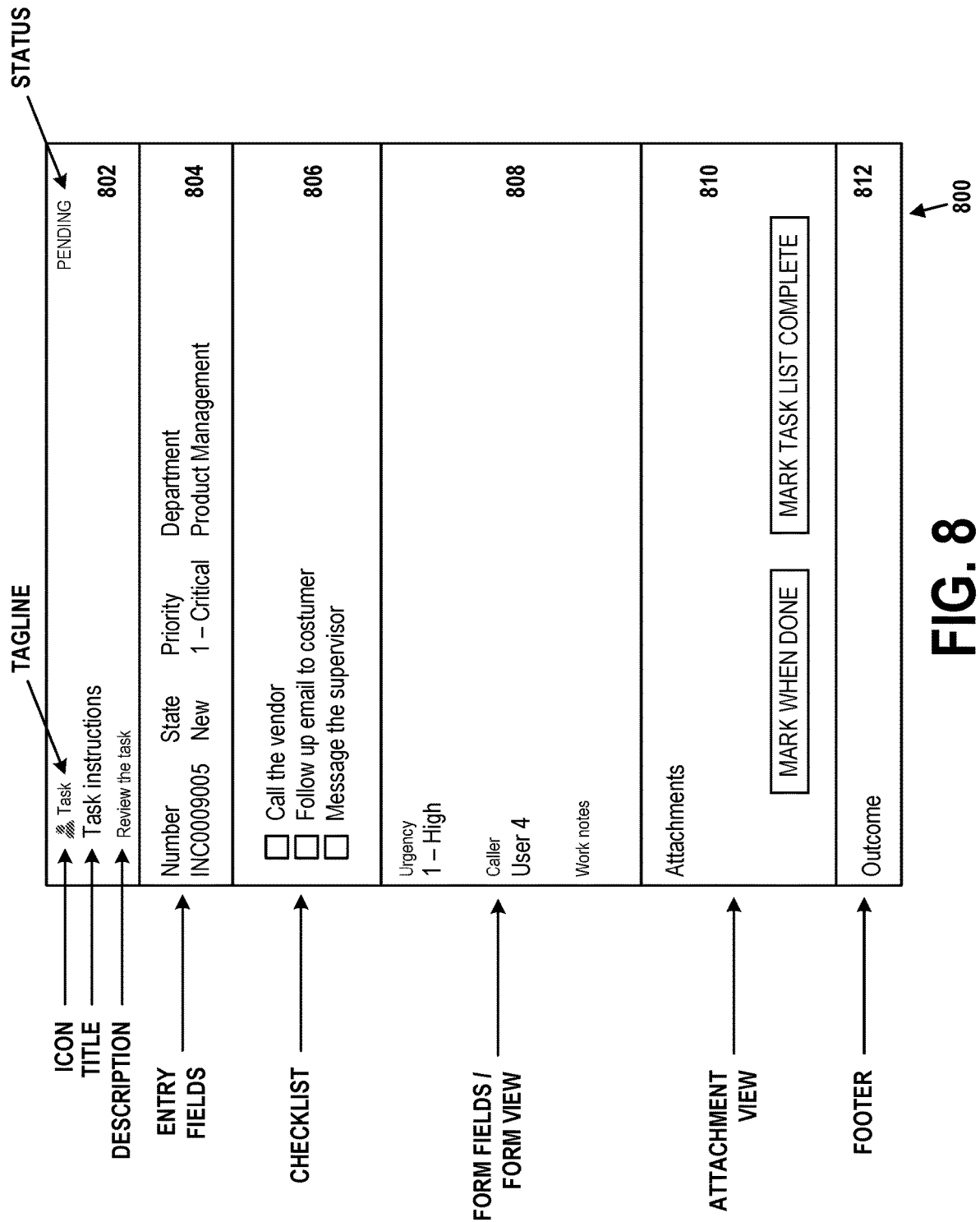
FIG. 8 depicts a configurable card layout for a graphical user interface, in accordance with example embodiments.

FIG. 8 depicts example card 800 with a number of properties appearing in a particular arrangement defined by a renderer. The displayed content of card 800 is meant to be descriptive of a database table entry. Actual cards would fill in certain properties with values related to such an entry and/or an application executing on a remote network management platform that makes use of the entry.

Section 802 includes three rows, the first with an icon, tagline, and state, the second with a title, and the third with a description. Section 804 includes fields related to a database table entry. Section 806 includes a checklist. Section 808 contains a number of form fields. Section 810 provides an interface for viewing and managing attachments. Section 812 contains a footer.

The locations, sizes, justifications, and other layout-related aspects of the properties of card 800 are configurable and can be overridden. For example, a custom renderer could omit the description from section 802, and place the status below the title. Further, the platform may support user-defined cards and activities. The program logic associated with activities may take on various interactive and non-interactive forms, including writing to a database, calling an API, sending an email, obtaining an approval, etc.

Declarative actions, which were briefly introduced above, allow users and applications to interact with activities in real time. Notably, activity properties can be updated in real time, and these updates may be acted on by declarative actions. Particularly, declarative actions define the actions that can be taken on properties, such as executing server scripts on database table entries (the current entry or related entries), executing client scripts, modifying aspects of graphical user interface 700 (e.g., opening tabs, displaying a sidebar), displaying custom modals (graphical elements that are subordinate to and/or displayed within other graphical elements), triggering execution of other parent processes, processes, or workflows, and/or completing, skipping, cancelling, or restarting activities.

Declarative actions are supported by rich libraries of conditional logic for server-side or client-side scripting over values of properties. This logic can be tied to specific activity definitions, so that activity types that are reused across cards have consistent behavior. This logic may be able to limit certain operations to particular user roles and/or permissions.

Figure 9:
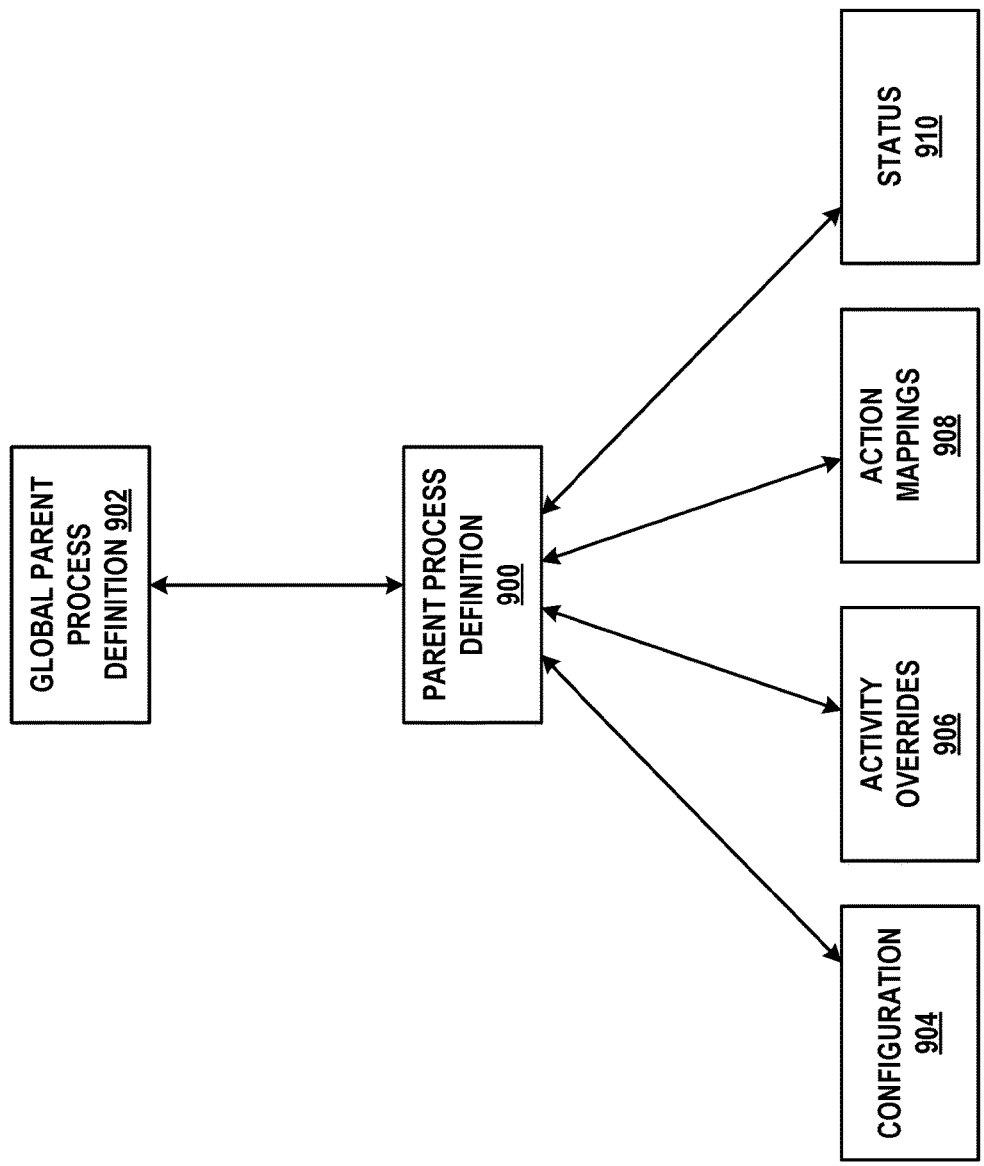
FIG. 9 depicts an arrangement of configurable aspects of a process, in accordance with example embodiments.

The configurability of the embodiments herein is illustrated in FIG. 9. Parent process definition 900 may be derived from pre-defined global parent process definition 902. Global parent process definition 902 may specify that any parent process definition derived therefrom inherits particular parameters, such as a configuration, activity overrides, action mappings, and status values. Some, but not all, of these parameters may be populated.

Thus, parent process definition 900 may include or refer to configuration 904, activity overrides 906, action mappings 908, and status 910. Configuration 904 may contain general configuration parameters of parent process definition 900. Activity overrides 906 may specify the properties of one or more activities relating to parent process definition 900 that are overridden and how they are overridden. Action mappings 908 include mappings between declarative actions of parent process definition 900 and their associated functionality. Status 908 provides the real-time state of various aspects of the parent process as it executes.

Each of parent process definition 900, configuration 904, activity overrides 906, action mappings 908, and status 910 may be defined by way of separate, respective database tables. These tables may include the appropriate references to one another so that relationships between these entities can be easily determined.

VII. Example Operations

Figure 10:
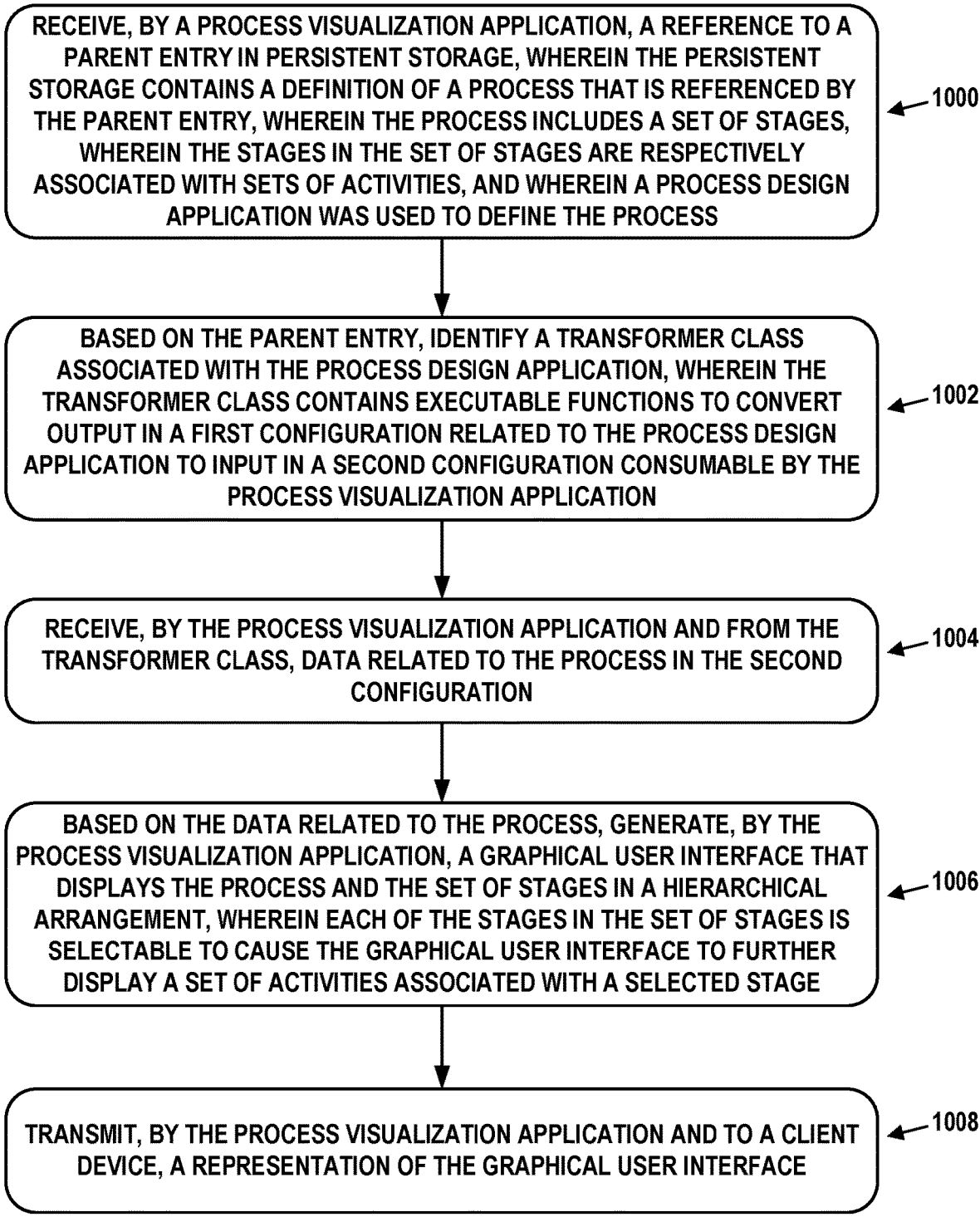
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, by a process visualization application, a reference to a parent entry in persistent storage, wherein the persistent storage contains a definition of a process that is referenced by the parent entry, wherein the process includes a set of stages, wherein the stages in the set of stages are respectively associated with sets of activities, and wherein a process design application was used to define the process.

Block 1002 may involve, possibly based on the parent entry, identifying a transformer class associated with the process design application, wherein the transformer class contains executable functions to convert output in a first configuration related to the process design application to input in a second configuration consumable by the process visualization application.

Block 1004 may involve receiving, by the process visualization application and from the transformer class, data related to the process in the second configuration.

Block 1006 may involve, possibly based on the data related to the process, generating, by the process visualization application, a graphical user interface that displays the process and the set of stages in a hierarchical arrangement, wherein each of the stages in the set of stages is selectable to cause the graphical user interface to further display a set of activities associated with a selected stage.

Block 1008 may involve transmitting, by the process visualization application and to a client device, a representation of the graphical user interface.

In some embodiments, the persistent storage further contains a second definition of a second process, wherein the second process is referenced by the parent entry, wherein the second process includes a second set of stages, wherein the stages in the second set of stages are respectively associated with second sets of activities These embodiments may further involve a second process design application that was used to define the second process, where the one or more processors are further configured to: (i) possibly based on the parent entry, identify a second transformer class associated with the second process design application, wherein the second transformer class contains second executable functions to convert output in a third configuration related to the process design application to input in the second configuration; (ii) receive, by the process visualization application and from the second transformer class, second data related to the second process in the second configuration; and (iii) possibly based on the second data related to the second process, generate, by the process visualization application, the graphical user interface to also display the second process and the second set of stages in the hierarchical arrangement, wherein each of the stages in the second set of stages is selectable to cause the graphical user interface to further display a second set of activities associated with the selected stage.

In some embodiments, a particular activity that is associated with a particular stage in the set of stages includes one or more declarative actions that can be used to change a state of the particular activity, wherein presence or appearance of the declarative actions on the graphical user interface is based on one or more of server-side conditions, client-side conditions, conditions related to the parent entry, conditions related to the process, or conditions related to the particular activity.

In some embodiments, a particular stage in the set of stages as displayed includes a declarative action that can be used to mark all activities associated with the particular stage to be completed.

In some embodiments, the process as displayed includes a declarative action that can be used to mark all activities associated with the set of stages to be completed.

In some embodiments, the process and the set of stages are represented on a first pane of the graphical user interface as selectable graphical elements in accordance with the hierarchical arrangement, and wherein a particular set of activities associated with a particular stage that was selected are represented on a second pane of the graphical user interface.

In some embodiments, receiving a selection of a selectable graphical element on the first pane that is associated with the particular stage causes the particular set of activities to be displayed on the second pane.

In some embodiments, each of the selectable graphical elements on the first pane display a representation of its completeness.

In some embodiments, each of the particular set of activities on the second pane includes a representation of whether it has been completed.

In some embodiments, activities of the particular set of activities on the second pane are represented as graphical card elements, and the graphical card elements are respectively associated with executable renderers that define an appearance of information displayed in the graphical card elements. In these embodiments, the executable renderers include a default renderer and one or more custom renderers, wherein each of the graphical card elements uses the default renderer unless it is associated with one of the custom renderers.

In some embodiments, the activities in the sets of activities are either interactive or non-interactive, wherein interactive activities prompt for user input and non-interface activities do not prompt for user input.

In some embodiments, the parent entry is associated with a reference to the process, wherein the process is associated with an indication that it was defined by the process design application, and wherein identifying the transformer class associated with the process design application comprises: (i) identifying the process from the reference to the process; (ii) identifying the process design application from the indication; and (iii) identifying the transformer class as being associated with the process design application.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage containing a definition of a process, wherein the definition of the process is referenced by a parent entry, wherein the process includes a set of stages reflecting a process structure, wherein the stages in the set of stages are respectively associated with sets of activities;
a first process design application that was used to define the process, and a second process design application used to define the process; and
one or more processors configured to:
receive, by a process visualization application, a reference to the parent entry provided by the first process design application and a second reference to the parent entry provided by the second process design application;
based on the parent entry, identify a first transformer class associated with the first process design application and a second transformer class associated with the second process design application, wherein the first and second transformer classes contain executable functions;
convert, by the first and second transformer classes, output of the first and second process design applications in a first configuration into data in a second configuration, wherein the data in the second configuration is consumable as input by the process visualization application;
receive, by the process visualization application and from the first and second transformer classes, the data in the second configuration and wherein the data reflect the process structure;
based on the process structure reflected in the data, generate, by the process visualization application, a graphical user interface that displays the process and the set of stages in a hierarchical arrangement, wherein each of the stages in the set of stages is selectable to cause the graphical user interface to further display a set of activities associated with a selected stage; and
transmit, by the process visualization application and to a client device, a representation of the graphical user interface.

2. The system of claim 1, wherein the persistent storage further contains a second definition of a second process, wherein the second process is referenced by the parent entry, wherein the second process includes a second set of stages, wherein the stages in the second set of stages are respectively associated with second sets of activities, the system further comprising:

a second process defined by a third process design application; and wherein the one or more processors are further configured to:
- based on the parent entry, identify a third transformer class associated with the third process design application, wherein the third transformer class contains second executable functions;
- convert, by the third transformer class, output of the third process design application in a third configuration into second data in the second configuration;
- receive, by the process visualization application and from the third transformer class, second data related to the second process in the second configuration; and
- based on the second data related to the second process, generate, by the process visualization application, the graphical user interface to also display the second process and the second set of stages in the hierarchical arrangement, wherein each of the stages in the second set of stages is selectable to cause the graphical user interface to further display a second set of activities associated with the selected stage.

3. The system of claim 1, wherein a particular activity that is associated with a particular stage in the set of stages includes one or more declarative actions that can be used to change a state of the particular activity, wherein presence or appearance of the declarative actions on the graphical user interface is based on one or more of server-side conditions, client-side conditions, conditions related to the parent entry, conditions related to the process, or conditions related to the particular activity.

4. The system of claim 1, wherein a particular stage in the set of stages as displayed includes a declarative action that can be used to mark all activities associated with the particular stage to be completed.

5. The system of claim 1, wherein the process as displayed includes a declarative action that can be used to mark all activities associated with the set of stages to be completed.

6. The system of claim 1, wherein the process and the set of stages are represented on a first pane of the graphical user interface as selectable graphical elements in accordance with the hierarchical arrangement, and wherein a particular set of activities associated with a particular stage that was selected are represented on a second pane of the graphical user interface.

7. The system of claim 6, wherein receiving a selection of a selectable graphical element on the first pane that is associated with the particular stage causes the particular set of activities to be displayed on the second pane.

8. The system of claim 6, wherein each of the selectable graphical elements on the first pane display a representation of its completeness.

9. The system of claim 6, wherein each of the particular set of activities on the second pane includes a representation of whether it has been completed.

10. The system of claim 6, wherein activities of the particular set of activities on the second pane are represented as graphical card elements, and the graphical card elements are respectively associated with executable renderers that define an appearance of information displayed in the graphical card elements.

11. The system of claim 10, wherein the executable renderers include a default renderer and one or more custom renderers, and wherein each of the graphical card elements uses the default renderer unless it is associated with one of the custom renderers.

12. The system of claim 1, wherein the activities in the sets of activities are either interactive or non-interactive, and wherein interactive activities prompt for user input and non-interface activities do not prompt for user input.

13. The system of claim 1, wherein the parent entry is associated with a reference to the process,
- wherein the process is associated with an indication that it was defined by the first and second process design applications,
- wherein identifying the first transformer class associated with the first process design application comprises:
  - identifying the process from the reference to the process;
  - identifying the first process design application from the indication; and
  - identifying the first transformer class as being associated with each of the first process design application; and
- wherein identifying the second transformer class associated with the second design application comprises:
- identifying the process from the reference to the process;
- identifying the second process design application from the indication; and
- identifying the second transformer class as being associated with the second process design application.

14. The system of claim 1, wherein the process structure specifies at least one relationship between each of the stages of the set of stages.

15. A computer-implemented method comprising:
- receiving, by a process visualization application, a reference to a parent entry in persistent storage, wherein the persistent storage contains a definition of a process that is referenced by the parent entry, wherein the process includes a set of stages reflecting a process structure, wherein the stages in the set of stages are respectively associated with sets of activities, and wherein a first process design application and a second process design application were used to define the process;
- based on the parent entry, identifying a first transformer class associated with the first process design application and a second transformer class associated with the second process design application, wherein the first and second transformer classes contain executable functions;
- converting, by the first and second transformer classes, output of the first and second process design applications in a first configuration into data in a second configuration, wherein the data in the second configuration is consumable as input by the process visualization application;
- receiving, by the process visualization application and from the first and second transformer classes, the data in the second configuration and wherein the data reflect the process structure;
- based on the process structure reflected in the data related to the process, generating, by the process visualization application, a graphical user interface that displays the process and the set of stages in a hierarchical arrangement, wherein each of the stages in the set of stages is selectable to cause the graphical user interface to further display a set of activities associated with a selected stage; and
- transmitting, by the process visualization application and to a client device, a representation of the graphical user interface.

16. The computer-implemented method of claim 15, wherein a particular activity that is associated with a particular stage in the set of stages includes one or more declarative actions that can be used to change a state of the particular activity, wherein presence or appearance of the declarative actions on the graphical user interface is based on one or more of server-side conditions, client-side conditions, conditions related to the parent entry, conditions related to the process, or conditions related to the particular activity.

17. The computer-implemented method of claim 15, wherein the process and the set of stages are represented on a first pane of the graphical user interface as selectable graphical elements in accordance with the hierarchical arrangement, and wherein a particular set of activities associated with a particular stage that was selected are represented on a second pane of the graphical user interface.

18. The computer-implemented method of claim 17, wherein activities of the particular set of activities on the second pane are represented as graphical card elements, and the graphical card elements are respectively associated with executable renderers that define an appearance of information displayed in the graphical card elements.

19. An article of manufacture including a non-transitory computer-readable medium, having stored thereon program instructions that, upon execution by a computing system, cause the computing system to perform operations comprising:

receiving, by a process visualization application, a reference to a parent entry in persistent storage, wherein the persistent storage contains a definition of a process that is referenced by the parent entry, wherein the process includes a set of stages reflecting a process structure, wherein the stages in the set of stages are respectively associated with sets of activities, and wherein a first process design application and a second process design application were used to define the process;

based on the parent entry, identifying a first transformer class associated with the first process design application and a second transformer class associated with the second process design application, wherein the first and second transformer classes contain executable functions;

converting, by the first and second transformer classes, output of the first and second process design applications in a first configuration into data in a second configuration, wherein the data in the second configuration is consumable as input by the process visualization application;

receiving, by the process visualization application and from the first and second transformer classes, the data in the second configuration and wherein the data reflect the process structure;

based on the process structure reflected in the data related to the process, generating, by the process visualization application, a graphical user interface that displays the process and the set of stages in a hierarchical arrangement, wherein each of the stages in the set of stages is selectable to cause the graphical user interface to further display a set of activities associated with a selected stage; and transmitting, by the process visualization application and to a client device, a representation of the graphical user interface.

20. The system of claim 14, wherein the at least one relationship identifies dependencies between the stages in the set of stages and the sets of activities.

* * * * *